United States Patent
Takenouchi

(10) Patent No.: US 9,607,174 B2
(45) Date of Patent: Mar. 28, 2017

(54) INFORMATION PROCESSING DEVICE, INFORMATION PROCESSING METHOD AND STORAGE MEDIUM

(71) Applicant: NEC Corporation, Tokyo (JP)

(72) Inventor: Takao Takenouchi, Tokyo (JP)

(73) Assignee: NEC Corporation, Tokyo (JP)

(*) Notice: Subject to any disclaimer, the term of this patent is extended or adjusted under 35 U.S.C. 154(b) by 39 days.

(21) Appl. No.: 14/435,125

(22) PCT Filed: Oct. 17, 2013

(86) PCT No.: PCT/JP2013/006175
§ 371 (c)(1),
(2) Date: Apr. 10, 2015

(87) PCT Pub. No.: WO2014/061275
PCT Pub. Date: Apr. 24, 2014

(65) Prior Publication Data
US 2015/0286841 A1    Oct. 8, 2015

(30) Foreign Application Priority Data

Oct. 18, 2012    (JP) ................................ 2012-230937

(51) Int. Cl.
*G06F 21/62*    (2013.01)
*G06F 17/30*    (2006.01)

(52) U.S. Cl.
CPC .... *G06F 21/6254* (2013.01); *G06F 17/30321* (2013.01)

(58) Field of Classification Search
CPC .................................................. G06F 21/6254
See application file for complete search history.

(56) References Cited

U.S. PATENT DOCUMENTS

2011/0041184 A1* 2/2011 Cormode ............ G06F 21/6254
726/26
2011/0321169 A1* 12/2011 Cormode ............ G06F 21/6254
726/26

FOREIGN PATENT DOCUMENTS

JP    2007-219636 A    8/2007
JP    2011-170632 A    9/2011

OTHER PUBLICATIONS

Harada et al. "*k*-anonymization Schemes with Automatic Generation of Generalization Trees and Distortion Measuring using Information Entropy", IPSJ SIG Technical Report, vol. 2010-CSEC-50 No. 47, (2010), pp. 1-7.

(Continued)

*Primary Examiner* — David Pearson
(74) *Attorney, Agent, or Firm* — Wilmer Cutler Pickering Hale and Dorr LLP

(57) ABSTRACT

An information processing device of the invention includes: an index reception unit which receives an index of anonymization of data; a group state measurement unit which measures a state of a group divided for anonymization of the data; a dividing point determination function selection unit which selects a dividing point determination function for determining a dividing point of the group based on the index and the state of the group; a division determination unit which calculates the dividing point of the data based on the selected dividing point determination function and divides the data into groups; and an abstraction unit which anonymizes the data based on the group.

10 Claims, 16 Drawing Sheets

(56) References Cited

OTHER PUBLICATIONS

M. Eracan Nergiz, Maurizio Atzori, and Christopher W. Clifron, "Hiding the Presence of Individuals From Shared Database", In Proceedings of the 2007 ACM SIGMOD International Conference on Management of Data (SIGMOD '07), [online], 2007, pp. 665-676.
International Search Report corresponding to PCT/JP2013/006175 mailed Nov. 12, 2013 (2 pages).
Extended European Search Report issued by the European Patent Office for Application No. 13846665.1 dated May 10, 2016 (9 pages).
Fung, B. C. M., et al., "Privacy-Preserving Data Publishing: A Survey of Recent Developments," ACM Computing Surveys, vol. 42, No. 4, Article 14, 53 pages (Jun. 2010).
LeFevre, K., et al., "Multidimensional K-Anonymity," University of Wisconsin, Madison, Department of Computer Sciences Technical Report 1521, 12 pages (Jun. 22, 2005).

\* cited by examiner

Fig.9

| A | B |   |   |
|---|---|---|---|
| A | B | D | C |
| B | B | D | C |
| A | A | D | C |
|   |   | D | C |

INFORMATION PROCESSING DEVICE, INFORMATION PROCESSING METHOD AND STORAGE MEDIUM

CROSS-REFERENCE TO RELATED APPLICATIONS

This application is a national stage application of International Application No. PCT/JP2013/006175 entitled "Information Processing Device and Information Processing Method," filed on Oct. 17, 2013, which claims the benefit of the priority of Japanese Patent Application No. 2012-230937, filed on Oct. 18, 2012, the disclosures of each of which are hereby incorporated by reference in their entirety.

TECHNICAL FIELD

The present invention relates to information processing and in particular, relates to a data anonymization process.

BACKGROUND ART

Background Art

With development of IT technology, a lot of data (information) are accumulated in an information processing device and an information processing system. For the development of science technology, it is useful to use the accumulated data (for example, data mining).

For example, Ministry of Health, Labour and Welfare holds data of the certificates of medical remuneration (medical prescription) of hospitals for the payment of health insurance. A medical research institute can realize quality improvement and efficiency improvement in a medical study by using medical prescription data.

However, the medical prescription includes personal data. Generally, the personal data includes data (ID: identifier) which specifies (identifies) an individual person and attribute data (sensitive data) which the individual person does not want to disclose. For the privacy protection, a personal data holder cannot provide the data to a third party as it is.

Accordingly, a technology to protect personal privacy and provide the personal data is used.

Methods of such technology are roughly divided into a "cryptography method" and a "perturbation method".

The cryptography method is a method in which at least a part of data is encrypted and data is provided. However, the cryptography method needs large calculation cost for encryption processing.

On the other hand, the perturbation method is a method in which the personal privacy is protected by using abstraction or non-identification by adding noise to the data or thinning the data without encryption. Such perturbation method is called data anonymization. The data after anonymization has anonymity.

As such anonymization, "k-anonymization" is widely used.

The k-anonymization is a process in which data is anonymized so as to include at least "k" pieces of data that includes the same quasi-identifier. Namely, as for the k-anonymized data, at least "k−1" pieces of data including the quasi-identifier same as the data are included in a data set other than the data. Such state of the data is called k-anonymity. Namely, the k-anonymized data has k-anonymity.

The quasi-identifier is data which is not the identifier (clear identifier) when alone and becomes the identifier when combined with other data.

Before providing information to a third party, an information providing side anonymizes data so as to satisfy k-anonymity by using an information processing device (for example, refer to patent literature 1). Further, generally, the information processing device for anonymizing data divides the data into groups which can ensure data anonymity and anonymizes the quasi-identifier of the data included in the group.

Here, the division into groups is a process in which the data is divided into a plurality of groups based on the quasi-identifier (attribute) that is anonymized. A boundary separating the groups from each other is called a "dividing point".

Further, when the number of kinds of the quasi-identifier to be anonymized is one, the number of dimensions of a space (a quasi-identifier space), in which a coordinate is the quasi-identifier, is one. Therefore, the boundary is a point. However, the number of the quasi-identifiers to be anonymized is not limited to one. The information processing device may anonymize a plurality of quasi-identifiers. When the information processing device anonymizes a plurality of quasi-identifiers, the quasi-identifier space has two or more dimensions. Therefore, the boundary between the groups is not a point but a line, a spread plane, or a space. However, generally, the boundary between the groups is not distinguished and called the "dividing point". Therefore, in the following explanation, it is not distinguished in particular and it is described as the "dividing point".

The information processing device which performs anonymization, for example, performs grouping as follows.

(1) The information processing device generates one group in which attribute values of the quasi-identifiers are the most ambiguous (anonymized) values.

(2) The information processing device determines the dividing point at which the data is divided into the groups and divides the data into the groups at the dividing point.

(3) The information processing device confirms whether or not the groups after division satisfy the k-anonymity.

(4) When the group satisfies the k-anonymity, the information processing device repeats the processes of step (2) to step (4) to the groups after division.

(5) When the group does not satisfy the k-anonymity, the information processing device returns the state of the group to the state before division and ends the process of division.

(6) The information processing device repeats the processes of step (2) to step (5) until the process of step (5) is performed to all the groups.

When such grouping process ends, the information processing device anonymizes the data based on the grouping.

CITATION LIST

Patent Literature

[PLT 1] Japanese Patent Application Laid-Open No. 2011-170632

SUMMARY OF INVENTION

Technical Problem

In the technology described in PTL 1, it is assumed that the number of data providers is one.

However, the number of data providers is not limited to one.

For example, there is a case in which a research institute wants to research by using the data from a plurality of hospitals.

In such case, the data from a plurality of hospitals is provided to the research institute after the data is combined with each other and ensured k-anonymity.

The data combined with the data from a plurality of providers (hospitals) has k-anonymity to the research institute. However, there is a case in which the provided data cannot ensure k-anonymity to another party, for example the provider.

For example, the data provider knows the data provided by self. Therefore, there is a case in which the data provider can reduce the k-anonymity of the data based on the data having k-anonymity and the data provided by self.

This case will be described specifically.

For example, it is assumed that the combined data has 4-anonymity.

On the other hand, the provider can find out which quasi-identifier the provided data becomes after anonymization.

Accordingly, the provider can eliminate the provided data from the data after anonymization and reduce the anonymity of the data from 4-anonymity to 3-anonymity.

Further, when three pieces of provided data have the same quasi-identifiers after anonymization, the provider can eliminate the three pieces of data from the data after anonymization. The data after anonymization has 4-anonymity. Namely, as for the data after anonymization, three pieces of data having the same quasi-identifier other than the data are included. However, the provider can specify the data provided by another provider by removing the three pieces of data provided by self.

Thus, the technology described in PTL 1 has a problem in which, when data is provided by a plurality of providers, anonymity cannot be ensured to the data provider.

An object of the present invention is to solve the above-mentioned problem and to provide an information processing device which can realize appropriate anonymization of the data to the provider and a data processing method.

Solution to Problem

An information system according to an exemplary aspect of the invention includes: index reception means for receiving an index of anonymization of data; an index reception unit which receives an index of anonymization of data; a group state measurement unit which measures a state of a group divided for anonymization of the data; a dividing point determination function selection unit which selects a dividing point determination function for determining a dividing point of the group based on the index and the state of the group; a division determination unit which calculates the dividing point of the data based on the selected dividing point determination function and divides the data into groups; and an abstraction unit which anonymizes the data based on the group.

An information processing method according to an exemplary aspect of the invention includes: receiving an index of anonymization of data; measuring a state of a group divided for anonymization of the data; selecting a dividing point determination function for determining a dividing point of the group based on the index and the state of the group; calculating the dividing point of the data based on the selected dividing point determination function; dividing the data into groups; and anonymizing the data based on the group.

A computer readable non-transitory medium embodying a program according to an exemplary aspect of the invention, the program causing an information processing device, which includes: a CPU; and a memory which is connected to the CPU, to perform a method, the method includes: receiving an index of anonymization of data; measuring a state of a group divided for anonymization of the data; selecting a dividing point determination function for determining a dividing point of the group based on the index and the state of the group; calculating the dividing point of the data based on the selected dividing point determination function; dividing the data into groups; and anonymizing the data based on the group.

Advantageous Effects of Invention

By the present invention, appropriate anonymization of data to the provider can be realized.

BRIEF DESCRIPTION OF DRAWINGS

FIG. 9 is a figure showing data used for explaining the information processing device according to the first exemplary embodiment.

DESCRIPTION OF EMBODIMENTS

Figure 1:
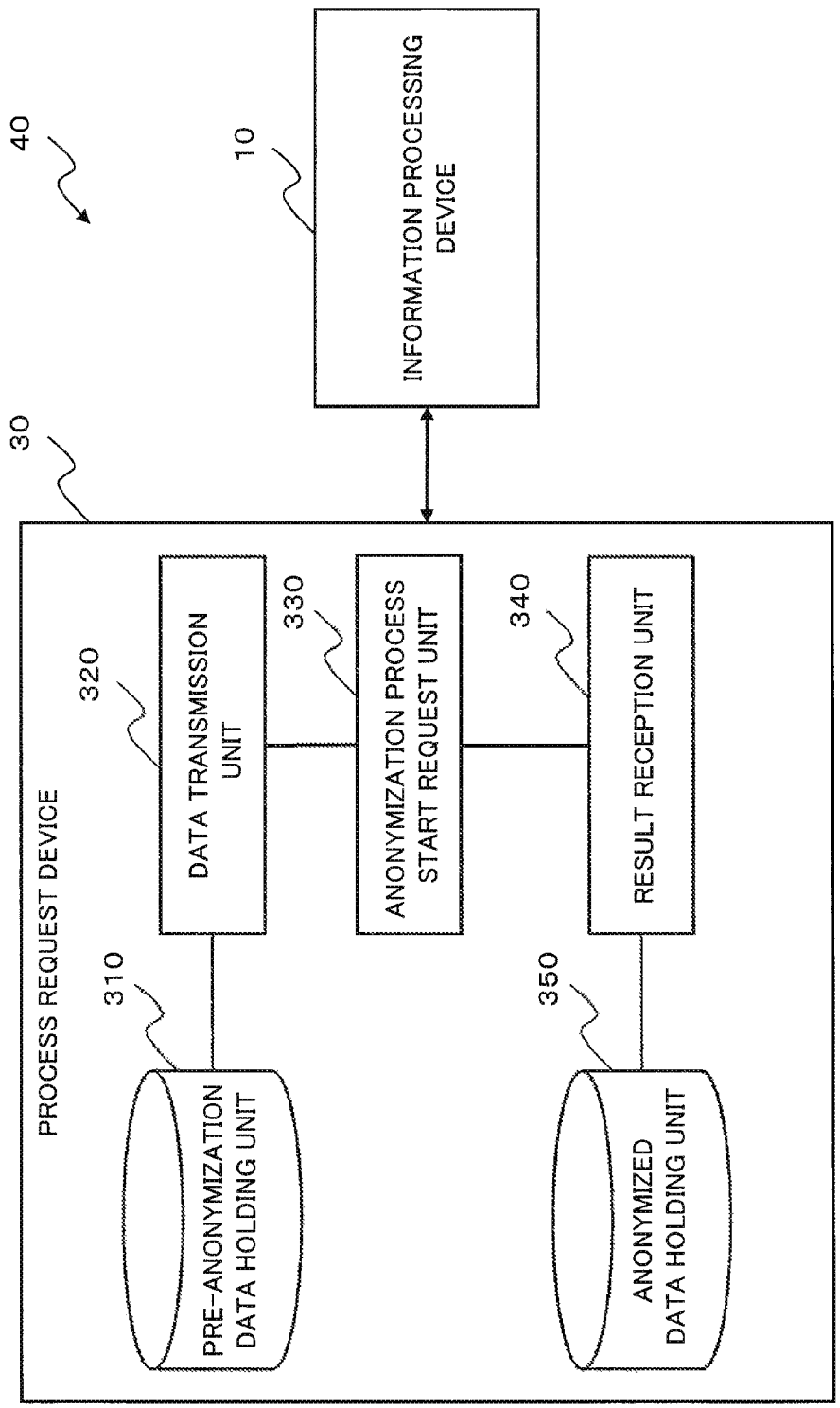
FIG. 1 is a block diagram showing an example of an information system including an information processing device according to a first exemplary embodiment of the present invention.

Next, an exemplary embodiment of the present invention will be described with reference to the drawing.

As an example of an information processing device of the present invention, a device which receives a request for anonymization of data and anonymizes the data is used for explanation. However, the information processing device of the present invention is not limited to this device. For example, the information processing device of the present invention may be a device for collecting statistical data. Alternatively, the information processing device of the present invention is a device for sorting data.

Each drawing is used for explaining the exemplary embodiment of the present invention. The present invention is not limited to the description of each drawing. The same reference numbers are used for the elements having the same function in each of the drawings and the repeated description of the elements may be omitted.

Next, terms used for explaining the exemplary embodiment will be explained below.

"K-anonymization" is, as described above, a process to anonymize data so as to include at least k pieces of data which has the same quasi-identifier (or a set of quasi-identifiers). The k-anonymized data has "k-anonymity". Namely, it is ensured that the data having "k-anonymity" is ensured so that at least k−1 pieces of data which has the same quasi-identifier (or the set of the quasi-identifiers) are included.

"Sk-site-anonymization" is a process to anonymize the data so as to include at least "sk" pieces of data which has the same quasi-identifier in the data removed the data (the number of records) of the data provider (site, hereinafter called the "provider") from the data set. The sk-site-anonymized data has "sk-site-anonymity".

For example, a case in which the anonymized data having 6-anonymity is generated is assumed. It is assumed that in the group of data which has the same identifier, two pieces of data provided by each provider are included at most. In this case, the data which is removed the data (two pieces of data at most) provided by the provider from the anonymized data has at least 4 (6−2=4) pieces of data including the same quasi-identifier, in other words, has 4-anonymity. Therefore, in this case, the data after anonymization has 6-anonymity and 4-site-anonymity.

Further, as sk-site-anonymity, the information processing device according to the exemplary embodiment need not be limited to anonymity to an alone provider. The information processing device according to the exemplary embodiment may ensure sk-site-anonymity corresponding to a combination of a plurality of providers.

For example, when the above-mentioned example is used, this is explained as follows.

Similarly, a case in which the anonymized data having 6-anonymity is generated is assumed. Further, it is assumed that in the group of data which has the same identifier, two pieces of data provided by each provider is included at most. The sk-site-anonymity corresponding to two providers is assumed. In this case, the data which is removed the data (four pieces of data at most) provided by two providers from the anonymized data has at least 2 (6−4=2) pieces of data which has the same quasi-identifier, in other words, has 2-anonymity. Therefore, in this case, the data after anonymization has 6-anonymity and 2-site-anonymity.

Further, the information processing device according to the exemplary embodiment may vary the number of providers to be combined.

For example, the information processing device may ensure sk-site-anonymity based on the reliability of the provider as explained below. Further, the reliability of the provider is not limited in particular. As an example, here, this will be explained by using a degree of possibility that the providers conspire.

It is assumed that four providers (providers A, B, C and D) exist.

It is assumed that there is a high possibility that the provider A, the provider B, and the provider C conspire. On the other hand, it is assumed that there is a low possibility that the provider D conspires with the other providers.

In this case, the information processing device ensures sk-site-anonymity to the alone provider and the providers that conspire with each other as follows, as sk-site-anonymity.

The alone provider: the provider A, the provider B, the provider C, and the provider D The conspiring providers: the provider A+the provider B, the provider B+the provider C, the provider C+the provider A, and the provider A+the provider B+the provider C However, in the following explanation, for convenience of explanation, it is assumed that the number of the providers that are sk-site-anonymization targets is one.

The information processing device according to the exemplary embodiment performs the anonymization so as to satisfy at least a predetermined sk-site-anonymity in the anonymization.

"Anonymization" generally means a process including not only a data processing process for anonymization but also a process required for anonymizing data (for example, a process of dividing data into groups). In the explanation of the exemplary embodiment, the process of anonymization includes a process of dividing data into the groups and a process of changing the grouped data for anonymization (anonymization in a broad sense). However, the "anonymization" may mean a process of changing the data after grouping (anonymization in a narrow sense). Therefore, in the explanation of the exemplary embodiment, when it is required to clearly discriminate between the anonymization in a broad sense and the anonymization in a narrow sense, the anonymization in a narrow sense may be described as "abstraction".

"Division" means a process of dividing data into the groups in the following explanation of the exemplary embodiment. Therefore, the division may be also called "grouping" or "making group".

"Dividing point", as described above, is the boundary by which the groups are separated from each other.

"Number of records" is the number of data in the following explanation of the exemplary embodiment. The number of records of the group is the number of data included in the group.

First Exemplary Embodiment

FIG. 1 is a block diagram showing an example of a configuration of an information processing system 40 including an information processing device 10 according to a first exemplary embodiment.

The information processing system 40 includes the information processing device 10 and a process request device 30. For example, the information processing device 10 is connected to the process request device 30 via a network.

The process request device 30 requests the information processing device 10 to anonymize data for data anonymization.

When the process request device 30 requests anonymization, the process request device 30 transmits an index indicating a target to be anonymized and the data to be anonymized (pre-anonymization data) to the information processing device 10. The process request device 30 receives the data after anonymization from the information processing device 10.

Accordingly, the process request device 30 includes a pre-anonymization data holding unit 310, a data transmission unit 320, an anonymization process start request unit 330, a result reception unit 340, and an anonymized data holding unit 350.

The pre-anonymization data holding unit 310 holds the pre-anonymization data which is requested to be anonymized by the information processing device 10.

The process request device 30 may hold the pre-anonymization data in advance. A way of the pre-anonymization data received by the process request device 30 is not limited in particular. For example, the process request device 30 may receive the data from the providers, combine the data, generate the pre-anonymization data, and hold it as the pre-anonymization data. Alternatively, the process request device 30 may receive the pre-anonymization data after combed from a device (not shown).

The data transmission unit 320 transmits the pre-anonymization data to the information processing device 10.

The anonymization process start request unit 330 requests the information processing device 10 to anonymize the transmitted pre-anonymization data. At the time of the request, the anonymization process start request unit 330 transmits the index of anonymization to the information processing device 10.

Further, the anonymization process start request unit 330 may transmit the index to the information processing device 10 before the data transmission unit 320 transmits the data. In this case, after the data transmission unit 320 transmits the pre-anonymization data, the anonymization process start request unit 330 requests the information processing device 10 to start to anonymize the data.

The result reception unit 340 receives the anonymized data (data after anonymization) from the information processing device 10, and stores it in the anonymized data holding unit 350.

The anonymized data holding unit 350 holds the data after anonymization.

However, a method for transmitting and receiving information between the process request device 30 and the information processing device 10 is not limited to this method.

For example, the process request device 30 may request the information processing device 10 to determine the dividing point of the data for anonymization.

Specifically, the process request device 30 operates as follows.

The process request device 30 transmits the index for anonymization and the pre-anonymization data to the information processing device 10. The information processing device 10 determines the dividing point to anonymize the data based on the received index and pre-anonymization data. The information processing device 10 transmits the determined dividing point to the process request device 30. The process request device 30 may anonymize the data based on the received dividing point, generate the data after anonymization, and hold it.

The pre-anonymization data may be held by another device (not shown) instead of the process request device 30. In this case, the process request device 30 notifies the information processing device 10 of a storage place of the index and the data. Further, the information processing device 10 may pick up the data from the storage place, and anonymize the data stored in the storage place based on the index.

The process request device 30 may not transmit the data to the information processing device 10. In this case, the process request device 30 notifies the information processing device 10 of the storage device (for example, the process request device 30 or another device (not shown)) for storing the index and the data. The information processing device 10 determines the dividing point of the data based on the index by referring to the data stored in the data storage. Then, the information processing device 10 notifies the storage device for storing the data of the dividing point. The storage device for storing the data anonymizes the data based on the received dividing point.

Next, the information processing device 10 will be described with reference to the drawing.

Figure 2:
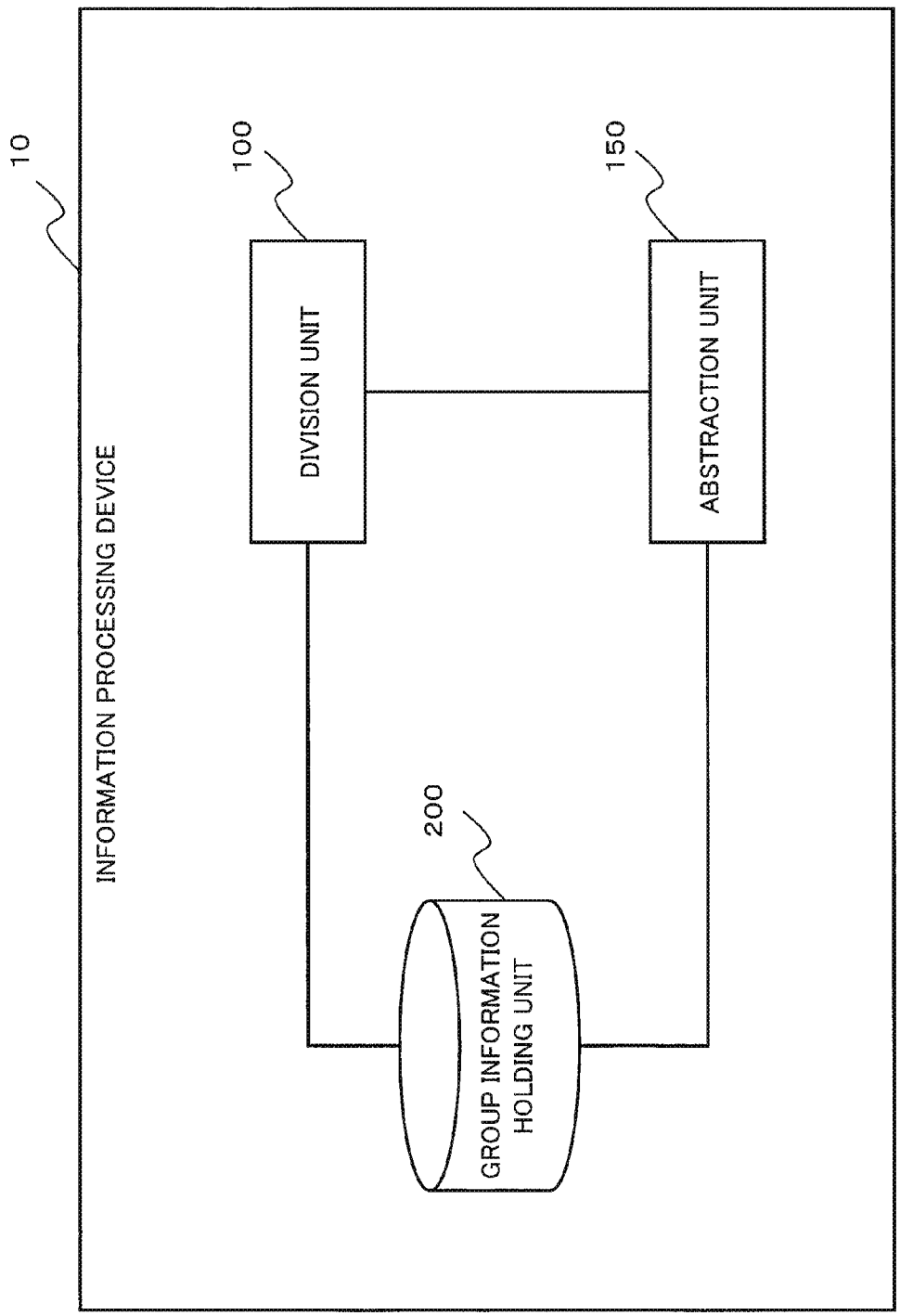
FIG. 2 is a block diagram showing an example of a configuration of the information processing device according to the first exemplary embodiment.

FIG. 2 is a block diagram showing an example of the configuration of the information processing device 10.

The information processing device 10 includes a division unit 100, an abstraction unit 150, and a group information holding unit 200.

The group information holding unit 200 holds the pre-anonymization data received from the process request device 30 and the data after anonymization that is anonymized by the abstraction unit 150. Further, the group information holding unit 200 may hold the data under being processed by the information processing device 10 (for example, a state of the division group determined by the division unit 100).

The division unit 100 determines the group division for anonymizing the data based on the received index and data. Namely, the division unit 100 determines the dividing point for anonymization.

The abstraction unit 150 anonymizes the data based on the division of the group (the dividing point) that is determined by the division unit 100. Further, anonymization performed by the abstraction unit 150 is anonymization in a narrow sense (abstraction).

Figure 3:
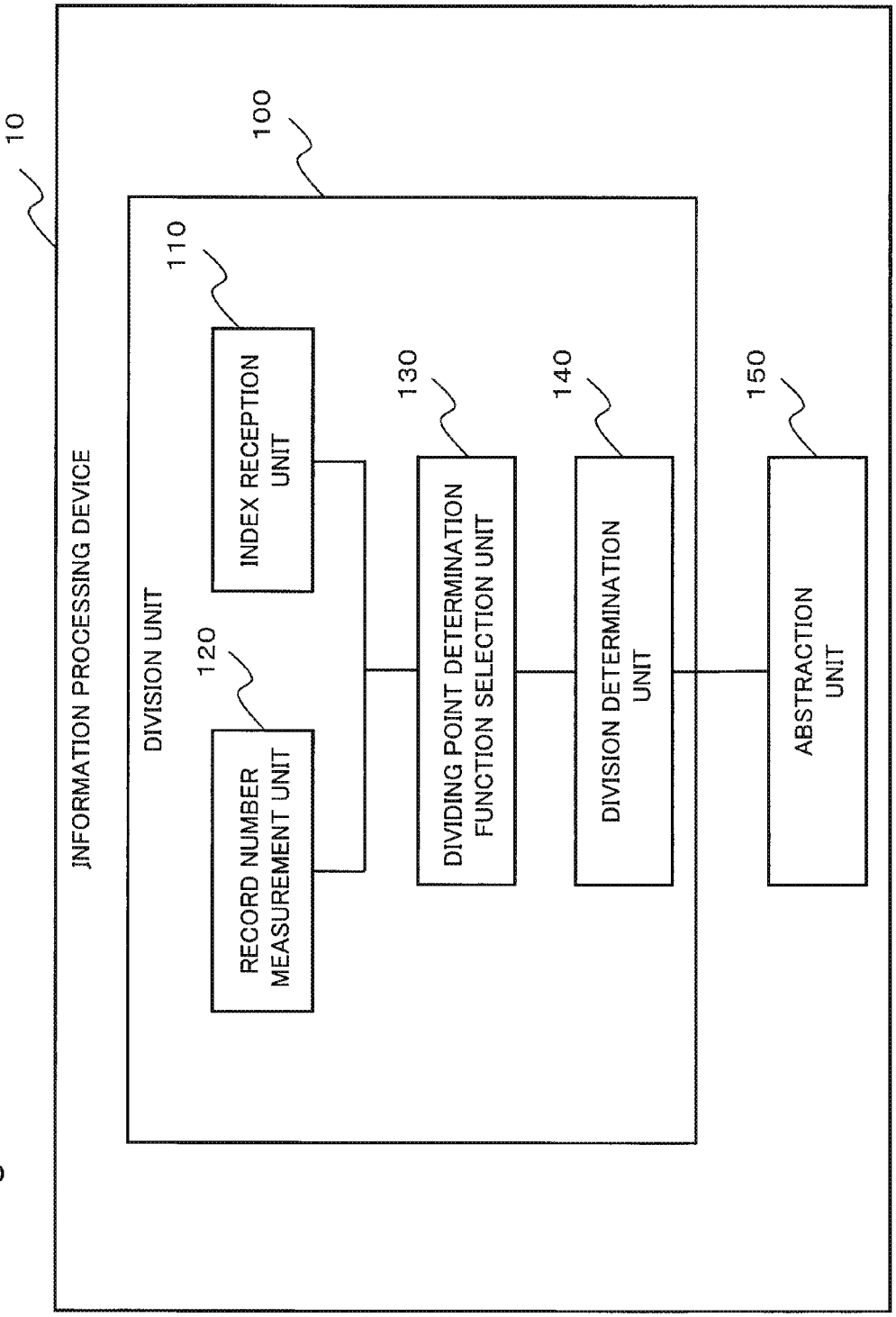
FIG. 3 is a block diagram showing an example of a detailed configuration of the information processing device according to the first exemplary embodiment.

FIG. 3 is a block diagram showing an example of a more detailed configuration of the information processing device 10 according to the first exemplary embodiment.

The division unit 100 shown in FIG. 3 includes an index reception unit 110, a record number measurement unit 120, a dividing point determination function selection unit 130, and a division determination unit 140.

As described above, the information processing device 10 according to the exemplary embodiment can operate without holding the data. Therefore, in FIG. 3, the group information holding unit 200 is omitted.

The index reception unit 110 receives the index for anonymizing the data that is a process target from the process request device 30. Such index is, for example, k-anonymity or sk-site-anonymity.

The record number measurement unit 120 measures the number of records of the group.

The dividing point determination function selection unit 130 selects a dividing point determination function used by the division determination unit 140 based on a predetermined determination criterion. Here, the dividing point determination function is a function to calculate a value (score) for determining the dividing point of the group of the data. The dividing point determination function selection unit 130 will be described later in detail.

The division determination unit 140 determines the dividing point of the data based on the selected dividing point determination function. Namely, the division determination unit 140 divides the data into the groups based on the dividing point determination function.

Based on these elements, the division unit 100 divides the data into the groups as much as possible in a range in which the index is satisfied.

After the division performed by the division unit 100 ends, the abstraction unit 150 anonymizes the data based on the divided groups. The data anonymized by the abstraction unit 150 is the "data after anonymization".

Next, the dividing point determination function selection unit 130 will be further described with reference to the drawing.

First, the division performed by the information processing device 10 according to the exemplary embodiment will be described.

Generally, the division, in which the group can be divided into many groups, in other words, the division, in which a number of records included in the group is small, has a low rate of anonymization and low deterioration of information of the data after anonymization. Therefore, the division, in which a number of records included in the group is small, is an appropriate division.

In each division, when the division is performed so as to satisfy the following condition as much as possible, the information processing device 10 can realize the appropriate division.

Division of condition 1: The providers in the group are not biased (hereinafter, referred to as [division 1]).

Division of condition 2: The number of the providers in the group is one (hereinafter, referred to as [division 2]).

The reason that the above-mentioned divisions are used is because it is easy to ensure sk-site-anonymity in the group after division when these divisions are performed.

The appropriateness and inappropriateness of the division will be explained with reference to the figure.

Figure 4:
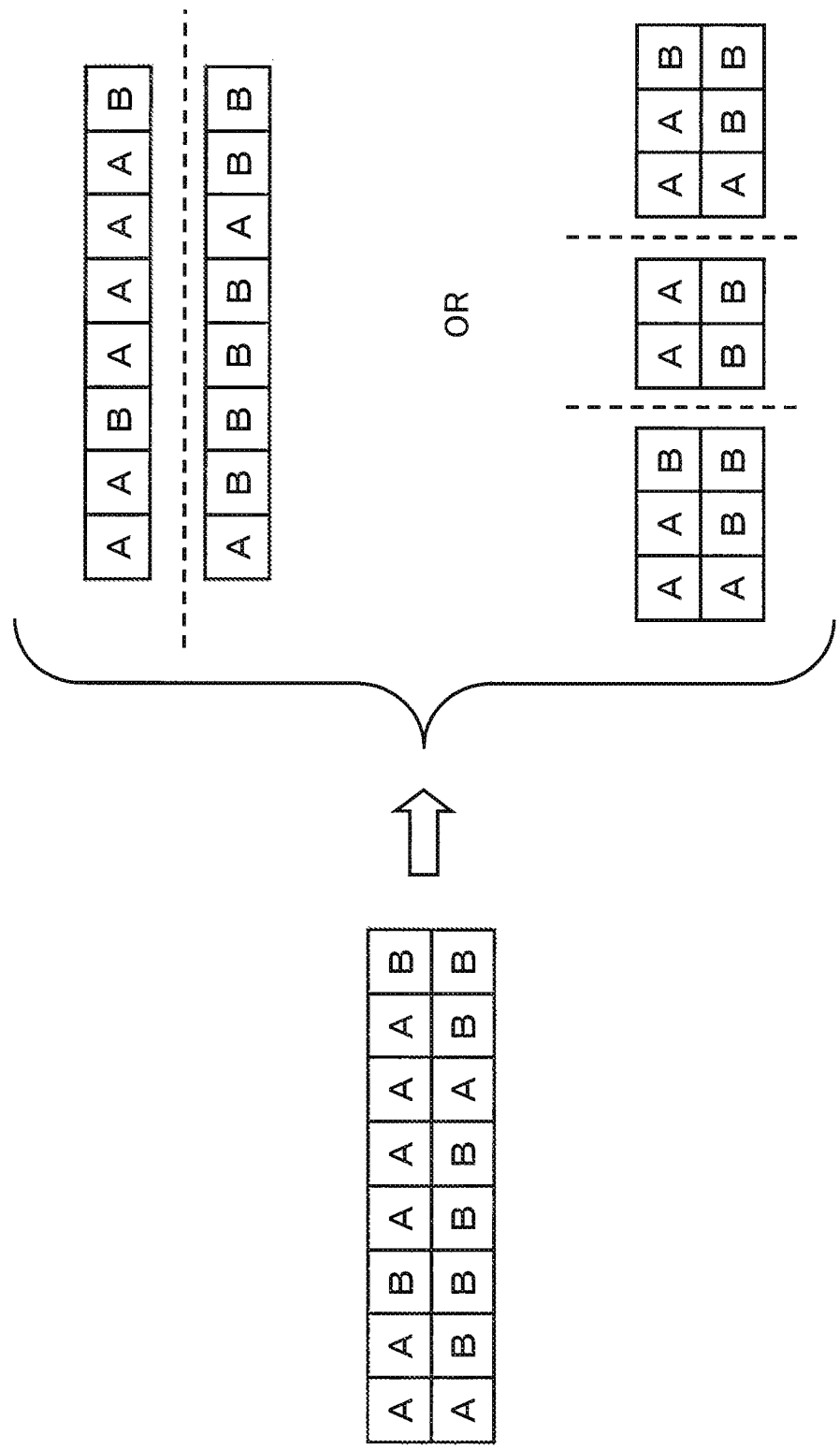
FIG. 4 is a figure showing an example of an inappropriate division.
Figure 5:
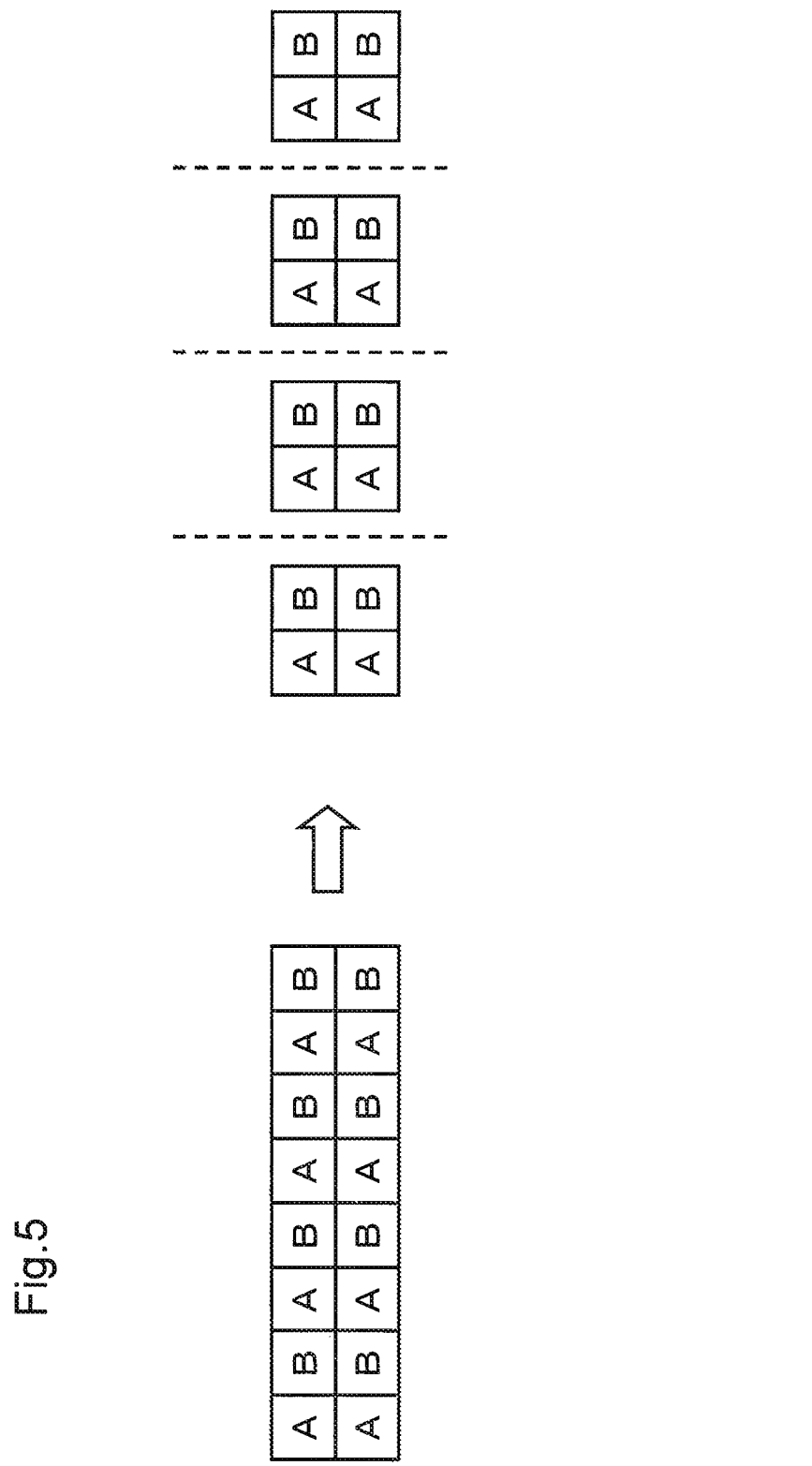
FIG. 5 is a figure showing an example of an appropriate division.
Figure 6:
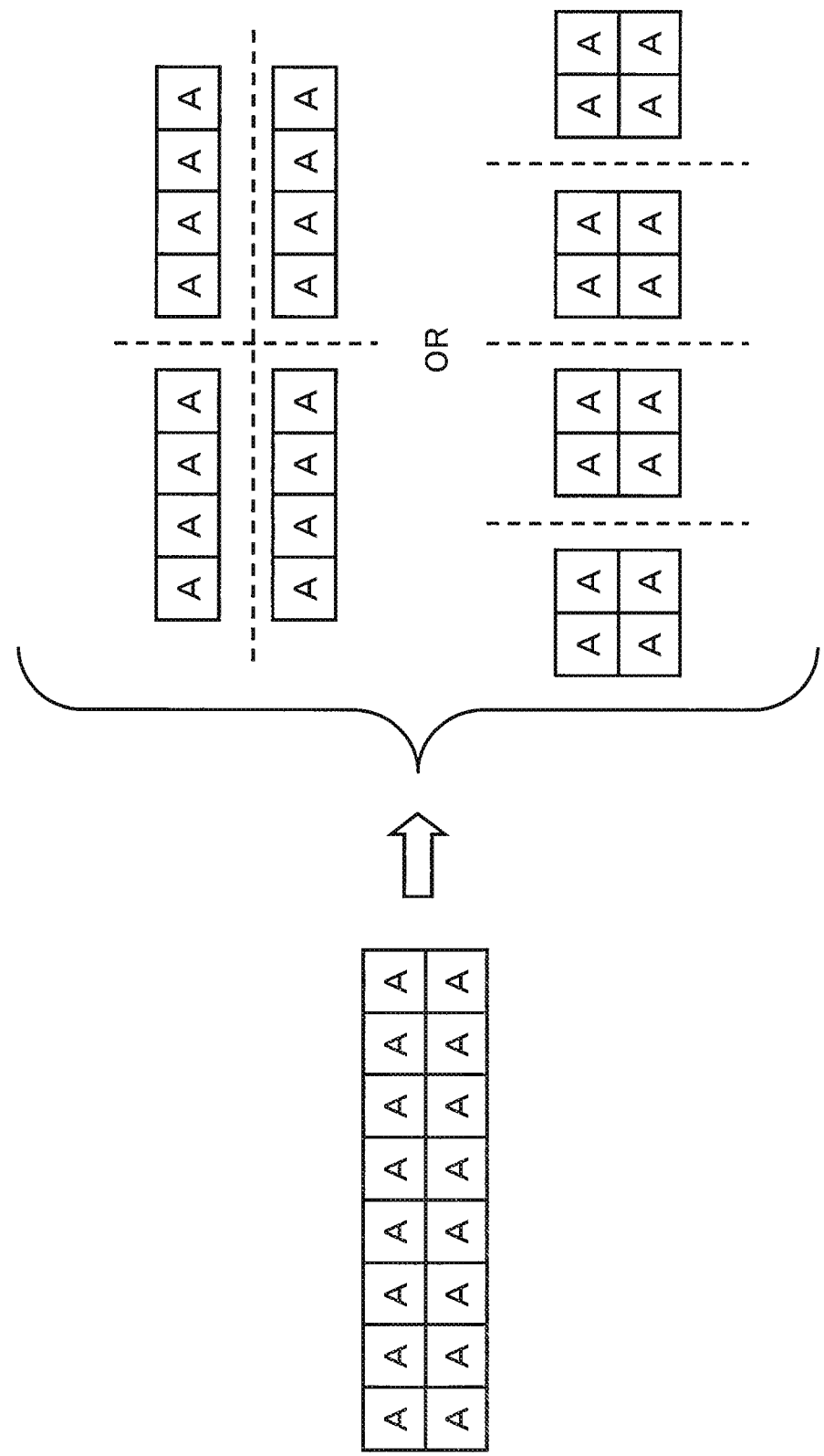
FIG. 6 is a figure showing an example of an appropriate division.

It is assumed that in the explanation using the following FIGS. 4 to 6, 4-anonymity and 2-site-anonymity are used as the index. In each figure, the group shown in a left part shows a group after the appropriate division or a group after the inappropriate division. The group shown in a right part indicates a final group division obtained by dividing the group shown in the left part.

FIG. 4 is a figure showing an example of the group after inappropriate division. In the group after division shown in the left part of FIG. 4, the providers are biased and a number of providers is a plural number. Therefore, the information processing device 10 divides the group after division shown in the left part of FIG. 4 into two or three groups as shown in the right part of FIG. 4.

FIG. 5 is a figure showing an example of an appropriate division corresponding to [division 1]. In the group after division shown in the left part of FIG. 5, the providers are not biased. Therefore, as shown in the right part of FIG. 5, the information processing device 10 can divide the group after division shown in the left part of FIG. 5 into four groups.

FIG. 6 is a figure showing an example of an appropriate division corresponding to [division 2]. In the group after division shown in the left part of FIG. 6, the number of the providers is one. Therefore, as shown in the right part of FIG. 6, the information processing device 10 can divide the group after division shown in the left part of FIG. 6 into two kinds of four groups.

However, when the division is performed so as to satisfy the condition of [division 2], the division is performed so as the providers are biased. Such [division 2] is the division which makes the condition of [division 1] worse.

Further, when the division is performed so as to satisfy the condition of [division 1], the division that satisfies the condition of [division 2] cannot be realized.

Thus, the information processing device 10 cannot perform the division so as to satisfy the condition of [division 1] and the condition of [division 2] simultaneously.

In order to ensure sk-site anonymity, it is the most desirable to satisfy the condition of [division 2]. However, when the division is performed so as to satisfy the condition of [division 2] and the index (for example, k-anonymity) cannot be satisfied before satisfying the condition of [division 2], the information processing device 10 cannot perform the division any more. As a result, the division becomes the division which cannot satisfy both the condition of [division 1] and the condition of [division 2]. The information processing device 10 desirably avoids such situation.

Thus, the information processing device 10 according to the exemplary embodiment includes the dividing point determination function selection unit 130. As described below, the information processing device 10 changes the dividing point determination function division that is used for determining the dividing point by the division determination unit 140.

Figure 7:
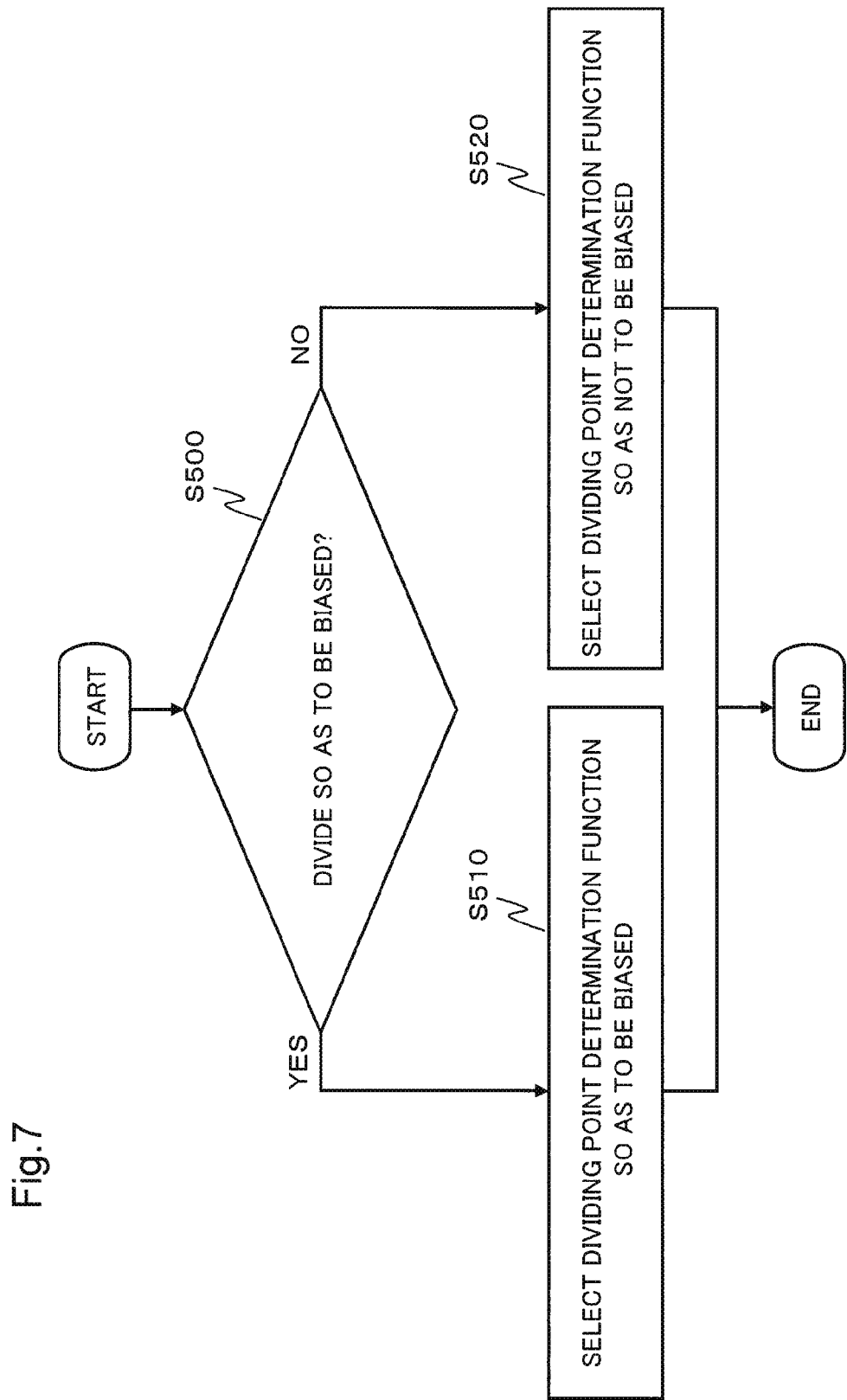
FIG. 7 is a flowchart showing an example of operation of a dividing point determination function selection unit.

FIG. 7 is a flowchart showing an example of the operation of the dividing point determination function selection unit 130.

First, the dividing point determination function selection unit 130 confirms whether or not there is a possibility in which the index is not satisfied before the division by which the number of the providers becomes one is performed (step S500). Specifically, the dividing point determination function selection unit 130 determines whether or not to divide so that the providers are biased based on the predetermined determination criterion.

When dividing so that the providers are biased ("YES" in step S500), the dividing point determination function selection unit 130 selects the dividing point determination function with which the providers are biased (step S510).

On the other hand, when dividing so that the providers are not biased ("NO" in step S500), the dividing point determination function selection unit 130 selects the dividing point determination function with which the providers are not biased (step S520).

The dividing point determination function selection unit 130 can adopt various determination criteria as the predetermined determination criterion. For example, the dividing point determination function selection unit 130 may compare a predetermined threshold value with a value related to the group division.

The dividing point determination function selection unit 130 may set the threshold value based on, for example, the index (k-anonymity or sk-site-anonymity) or the number of the providers as the predetermined threshold value.

Further, the dividing point determination function selection unit 130 may use the size (the number of records) of the group or the total number of the groups as the value related to the group division.

When some examples of the determination criterion are shown, the following determination criterion can be assumed. Further, in an equation described below, the following variables are used.

L: the number of records in the group
k: k-anonymity
sk: sk-site-anonymity
M: the number of providers
Mg: the number of providers in the group C: predetermined constant number (1) an example of comparison between "state of group" and "index"
 a) comparison between "L" and "C×sk"
 b) comparison between "L" and "C×k"

(2) an example of comparison based on "state of group" and a combination of "index" and information of "provider"
 a) comparison between "L" and "sk×M"
 b) comparison between "L" and "sk×Mg"
 c) comparison between "L" and "k×M"

Further, the determination criterion may be set to the information processing device 10 in advance before performing anonymization. For example, the information processing device 10 may hold the determination criterion in advance. Alternatively, the information processing device 10 may receive the determination criterion from another device such as the process request device 30 or the like.

When the dividing point determination function selection unit 130 selects the dividing point determination function, the dividing point determination function selection unit 130 at least selects one of the following processes and performs it.

(1) A process of selecting the dividing point determination function to be applied from among a plurality of dividing point determination functions.

(2) A process of selecting determination of a magnitude of a score of the dividing point determination function used for determination of the dividing point.

For example, the selection of determination of the magnitude means the following selections.

Magnitude of a value: to select either a case in which the value of the function is large or a case in which the value of the function is small.

Positive/negative: to select either a case in which the value or the change rate of the function is positive or a case in which the value or the change rate of the function is negative.

(3) A process of selecting a parameter of the dividing point determination function.

For example, the selection of the parameter means the following operation.

When the dividing point determination function is a function as "$f(x)=\alpha g(x)+\beta h(x)$", the dividing point determination function selection unit 130 selects a value of $\alpha$ and a value of $\beta$ from among the predetermined values (for example, $-1$, $0$, and $1$). Here, $g(x)$ and $h(x)$ are the predetermined functions. This selection also means to select the combination of the functions.

The dividing point determination function selection unit 130 may combine the above-mentioned selections. For example, the dividing point determination function selection unit 130 may select the dividing point determination function from among a plurality of the dividing point determination functions and then select the magnitude of the value of the function.

The selection of the dividing point determination function performed by the dividing point determination function selection unit 130 is the selection of the operation from the different operations which are the operation in which the providers are biased and the operation in which the providers are not biased. Therefore, the selection of the dividing point determination function selection unit 130 becomes the selection among the options that are discontinuous. For example, in a case of the above-mentioned process (3), the dividing point determination function selection unit 130 does not select the values of $\alpha$ and $\beta$ among continuous values but selects them among discrete values.

The dividing point determination function selection unit 130 can use various functions as the dividing point determination function. For example, the dividing point determination function selection unit 130 may use entropy or may use the mean or median value of the data.

For example, the dividing point determination function selection unit 130 may uses the following equation which is a sum of entropy after group division as the dividing point determination function.

[Equation 1]

$$\text{score}(c) = \text{Entropy}(\text{group}_1) + \text{Entropy}(\text{group}_2) \quad (1)$$

Here, Entropy (group) is the following equation.

[Equation 2]

$$\text{Entropy(group)} = -\sum_{s \in \{source\}} \frac{\text{Number of Site}(s, \text{group})}{|\text{group}|} \log\left(\frac{\text{Number of Site}(s, \text{group})}{|\text{group}|}\right) \quad (2)$$

When the providers are biased (step S510), the dividing point determination function selection unit 130 selects the dividing point determination function so that the score of the dividing point determination function becomes small. Namely, the information processing device 10 performs the division at the dividing point at which entropy is small.

On the other hand, when the providers are not biased (step S520), the dividing point determination function selection unit 130 selects the dividing point determination function so that the score of the dividing point determination function becomes large. Namely, the information processing device 10 performs the division at the dividing point at which entropy is large.

Next, the operation of the information processing device 10 will be described with reference to the drawing.

Figure 8:
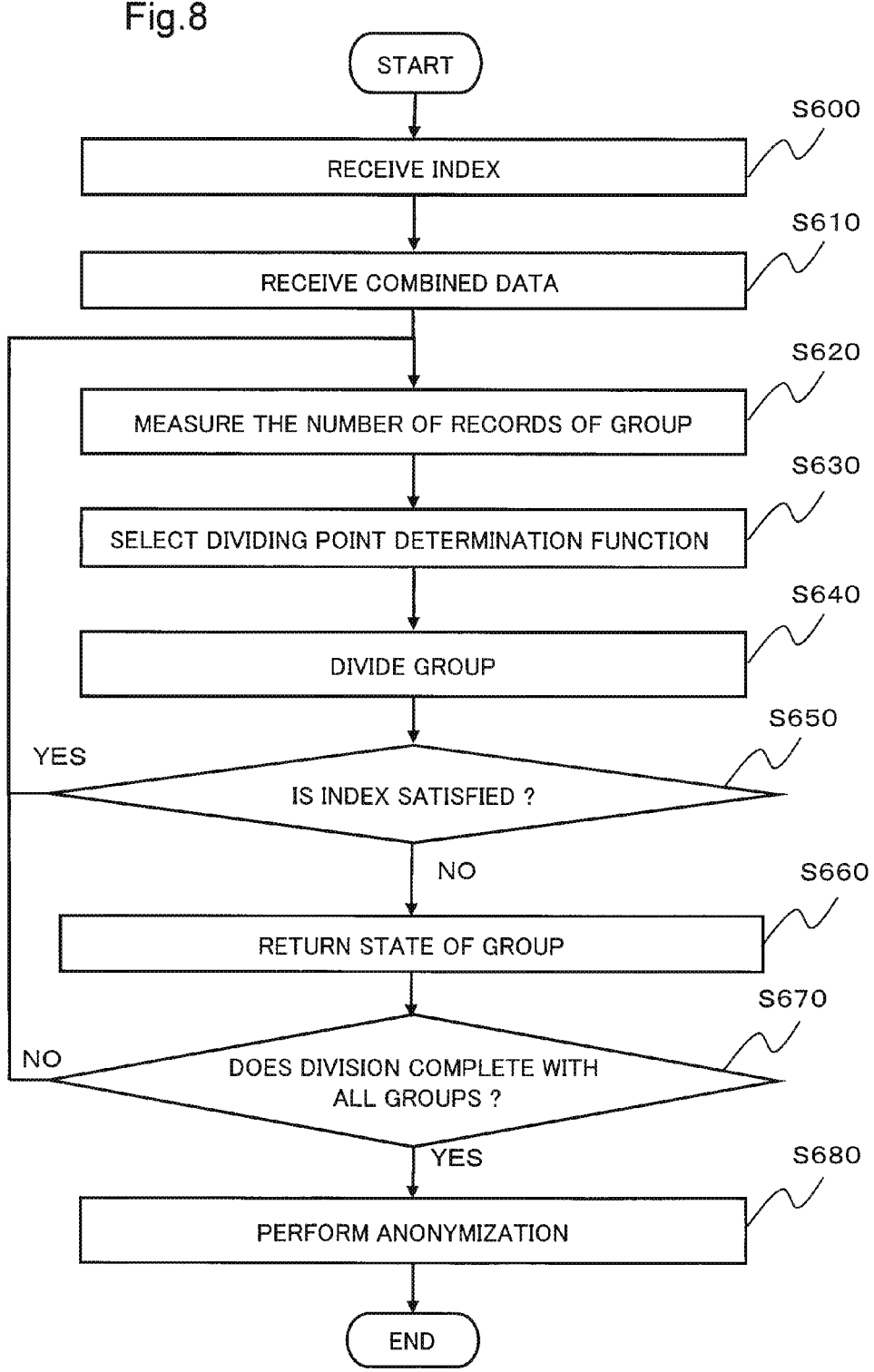
FIG. 8 is a flowchart showing an example of operation of the information processing device according to the first exemplary embodiment.

FIG. 8 is a flowchart showing an example of the operation of the information processing device 10.

The index reception unit 110 of the information processing device 10 receives the index for anonymization (step S600).

The information processing device 10 receives the data (pre-anonymization data) that is an anonymization target (step S601). The information processing device 10 stores the received data in the group information holding unit 200.

Generally, the pre-anonymization data is not divided into groups.

First, the division determination unit 140 of the division unit 100 sets the whole data to one group. This process is also called an initialization of the data. Further, when the abstraction unit 150 anonymizes the data after initialization that is of one group, the data is anonymized with the highest anonymity rate.

However, the information processing device 10 may receive the data that are grouped at some level instead of this data.

Next, the record number measurement unit 120 of the division unit 100 measures the number of records of the group (step S620). When there are a plurality of the groups, the record number measurement unit 120 measures the number of records of all the groups to which measurement has not been performed. However, the record number measurement unit 120 may measure the number of records of all the groups with including re-measurement.

Next, the dividing point determination function selection unit 130 selects the dividing point determination function based on the predetermined determination criterion (step S630).

The division determination unit 140 determines the dividing point at which the data is divided into the groups by using the selected dividing point determination function (step S640). The division determination unit 140 divides the data into the groups at the dividing point. Here, the division determination unit 140 may store information about a new group or a division state in the group information holding unit 200.

The division determination unit 140 confirms whether or not the new group satisfies the index (k-anonymity and sk-site-anonymity) (step S650).

When the index is satisfied ("YES" in step S650), the division unit 100 returns to step S320 and continues the process.

When the index is not satisfied ("NO" in step S650), the group cannot be further divided into the groups. Therefore, the division determination unit 140 cancels the last division and returns the state of the group to the state of the group before the last division (step S660). Namely, the division determination unit 140 sets the division state of the group to the preceding state of the group. Hereinafter, the state of the group which cannot be divided any more is called "division completion".

Next, the division determination unit 140 determines whether or not all the groups are in the "division completion" state (step S670).

When a group which can be further divided exists ("NO" in step S670), the division unit 100 returns to step S320 and continues the process.

When all the groups are in the "division completion" state ("YES" in step S670), the division unit 100 ends the process.

After the division unit 100 ends the process, the abstraction unit 150 anonymizes (anonymization in a narrow sense) the data for each divided group, and generates the data after anonymization. The abstraction unit 150 stores the data after anonymization in the group information holding unit 200. Further, the abstraction unit 150 sends the data after anonymization to the process request device 30 (step S680).

Next, the grouping performed by the information processing device 10 according to the exemplary embodiment will be described by using the specific data.

Figure 9:
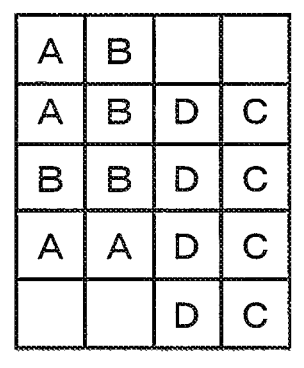

FIG. 9 is a figure showing a distribution of the quasi-identifier (attribute) of the data used in explanation of operation of the information processing device 10.

A vertical direction and a horizontal direction of the data shown in FIG. 9 show a value or a range of the attribute of the data. The data shown in FIG. 9 shows a distribution of two quasi-identifiers as a two-dimensional table. Further, "A, B, C, and D" represent the providers. Namely, FIG. 9 shows an example of the data obtained by combining the data provided by four providers as the distribution of two quasi-identifiers.

Further, as explained above, two dimensions of the data shown in FIG. 9 is an example. In the information processing device 10 according to the exemplary embodiment, the number of the quasi-identifiers to be anonymized is not limited in particular. The information processing device 10 according to the exemplary embodiment may use one quasi-identifier or more than two quasi-identifiers.

Figure 10:
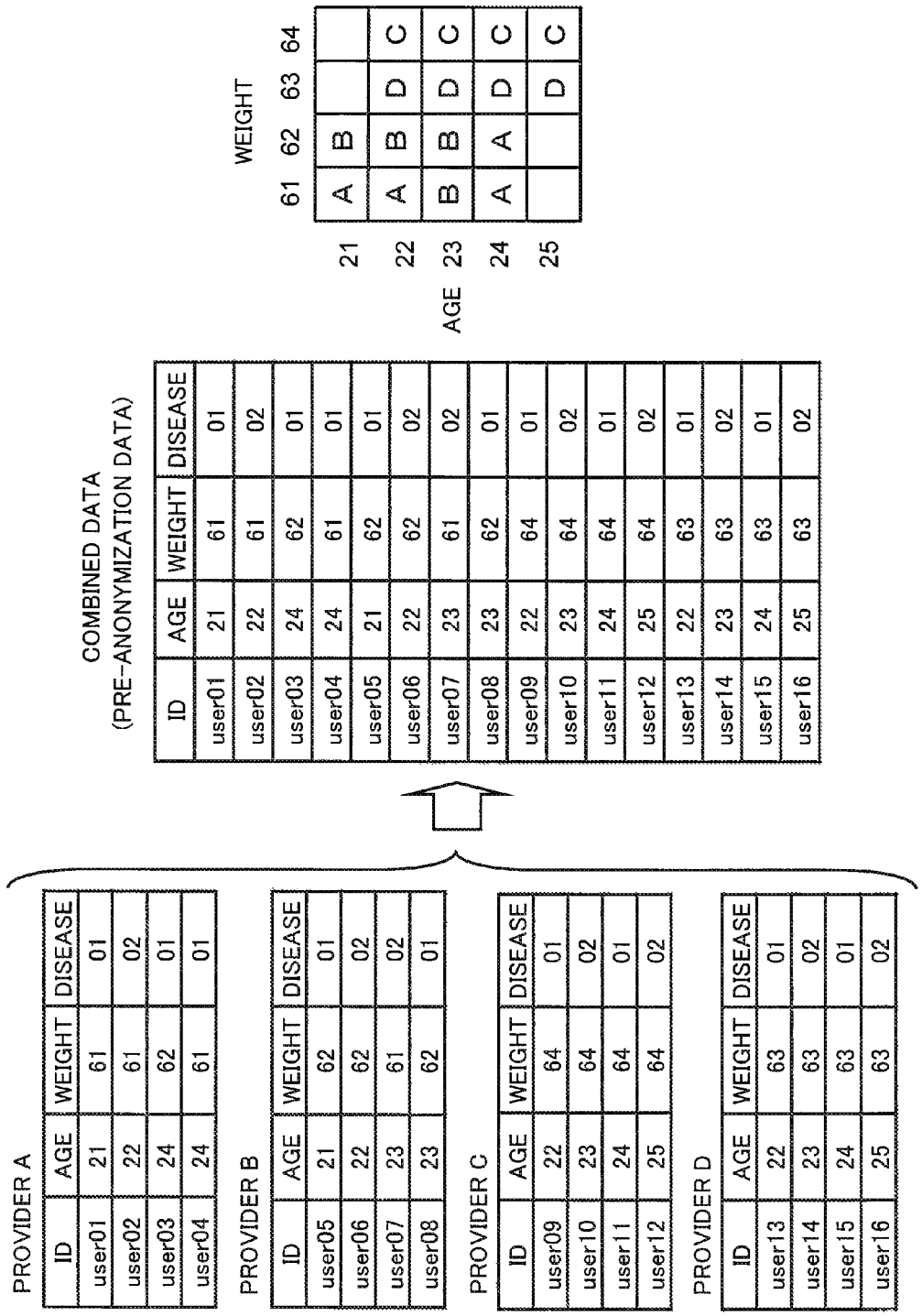
FIG. 10 is a figure for explaining an example of data according to the first exemplary embodiment.

FIG. 10 is a figure for explaining an example of a method for generating the data shown in FIG. 9.

For example, the process request device 30 combines the data provided by the providers A, B, C, and D shown in a left part of FIG. 10 and generates the data shown in a center part of FIG. 10. Based on this data, the information processing device 10 generates the data (the data shown in FIG. 9) of distribution shown in a right part of FIG. 10 as a distribution corresponding to age and weight in anonymization of the data.

Further, a case in which 4-anonymity and 2-site-anonymity are ensured will be described below as an example.

Figure 11:
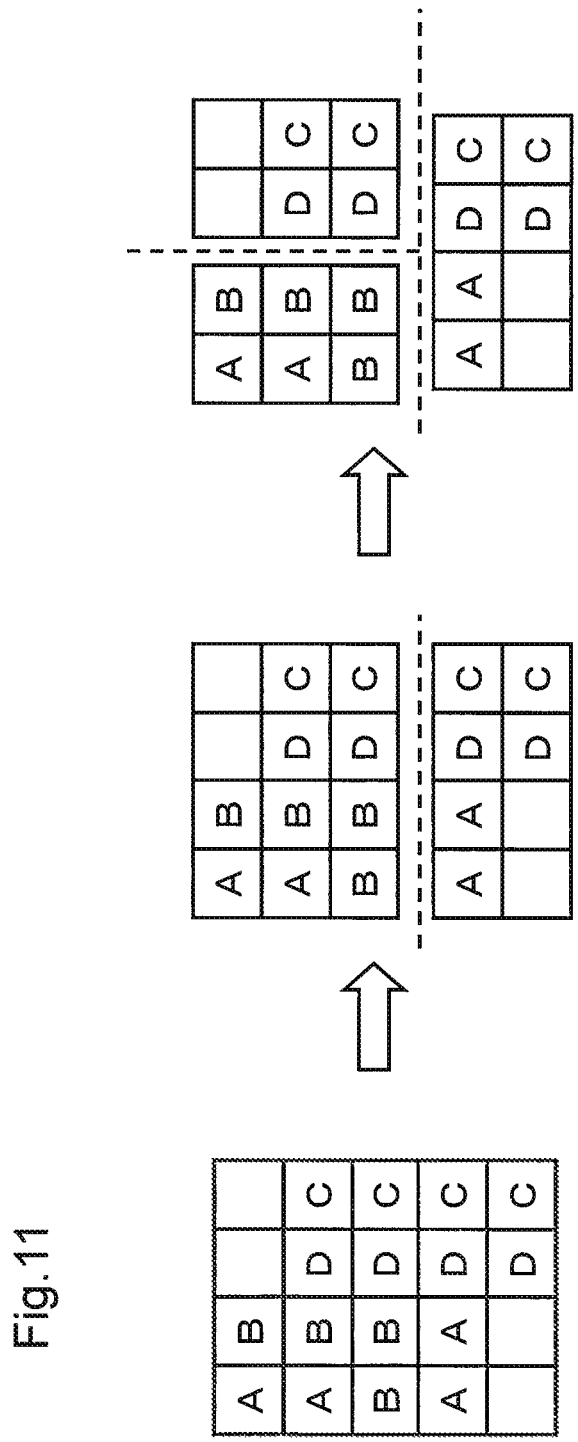
FIG. 11 is a block diagram showing an example of dividing data.

Before explaining the division performed by the information processing device 10 according to the exemplary embodiment, the division using a common division method (for example, Mondrian) will be explained. In the division using Mondrian, a median of the quasi-identifier which has a large range is used as the dividing point. Therefore, in the method using Mondrian, as shown in FIG. 11, the data shown in FIG. 9 is divided into three groups by twice divisions.

Next, the data division performed by the dividing point determination function selection unit 130 of the information processing device 10 will be described.

In this explanation, it is assumed that the dividing point determination function selection unit 130 uses a comparison between "L (a size of the group)" and "sk (sk-site-anonymity)×M (the number of the providers)" as the determination criterion.

In FIG. 9, the data is provided by four providers. Further, in this time, 2-site-anonymity is used as the index. Therefore, the dividing point determination function selection unit 130 compares "L" with "8=2×4".

In a case of "L>8", the dividing point determination function selection unit 130 selects the dividing point determination function so that the providers are biased.

On the other hand, in a case of "L<=8", the dividing point determination function selection unit 130 selects the dividing point determination function so that the providers are not biased.

(1) Initial State

In an initial state, the whole data forms one group. Namely, L="16".

Therefore, "L (=16)>8" is satisfied ("YES" in step S500).

Accordingly, the dividing point determination function selection unit 130 selects the dividing point determination function so that the providers are biased. For example, when the equation (1) is used, the dividing point determination function selection unit 130 performs the selection so that the score of the dividing point determination function becomes small.

Figure 12:
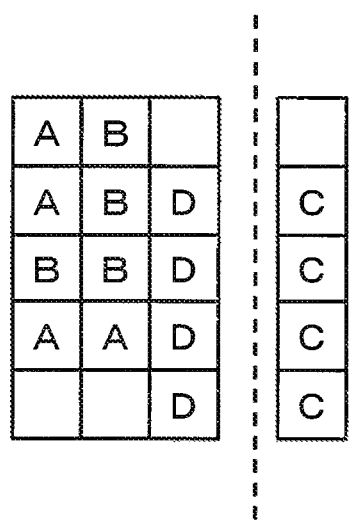
FIG. 12 is a figure for explaining division of data according to the first exemplary embodiment.

FIG. 12 shows the group after division determined by the division determination unit 140. In this case, the score is calculated as follows.

$$\text{score} = \text{entropy of the group shown in a left part} + \text{entropy of the group shown in a right part}$$

$$= (0.15904 + 0.15904 + 0.00000 + 0.15904) + (0.00000 + 0.00000 + 0.00000 + 0.00000)$$

$$= 0.47712$$

The values are rounded off to five decimal places.

In the group shown in a right part of FIG. 12, the number of the providers is one [division 2].

(2) Second Division

In the group shown in the right part of FIG. 12, because of L=4, the determination of step S500 is "NO". Further, when the group is further divided, 4-anonymity is not satisfied. Therefore, the group shown in the right part is in a division end state.

On the other hand, in the group shown in a left part of FIG. 12, because of L=12, the determination of step S500 is "YES". Accordingly, the dividing point determination function selection unit 130 selects the dividing point determination function so that, in the group shown in a left part, the providers are biased. For example, when the equation (1) is used, the dividing point determination function selection unit 130 selects the dividing point determination function so that the score of the dividing point determination function becomes small.

Figure 13:
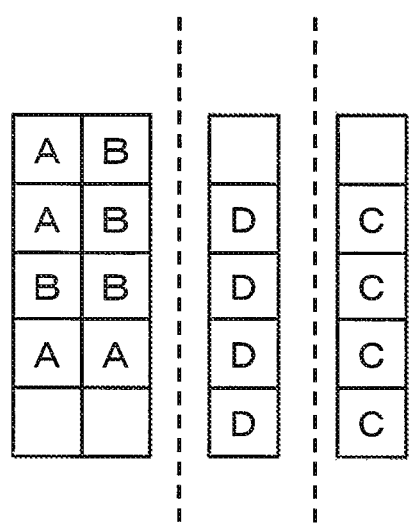
FIG. 13 is a figure for explaining division of data according to the first exemplary embodiment.

FIG. 13 shows the group after division. In this case, the score is calculated as follows.

$$\begin{aligned}score &= \text{entropy of the group shown in a left part} + \\ &\quad \text{entropy of the group shown in a right part} \\ &= (0.15052 + 0.15052 + 0.00000 + 0.00000) + \\ &\quad (0.00000 + 0.00000 + 0.00000 + 0.00000) \\ &= 0.30104\end{aligned}$$

The values are rounded off to five decimal places.

In the group shown in a center part of FIG. 13, the number of providers is one [division 2].

(3) Third Division

In the group shown in a right part of the dividing point of the second division in FIG. 13 (the group shown in a center part of FIG. 13), because of L=4, the determination of step S500 is "NO". Further, when the group is further divided, 4-anonymity is not satisfied. Therefore, the group shown in a right part is in the division end state.

On the other hand, in the group shown in a left part of FIG. 12, because of L=8, the determination of step S500 is "NO". Even if the group shown in the left part is divided, 4-anonymity is satisfied. Then, the dividing point determination function selection unit 130 selects the dividing point determination function so that, in the group shown in the left part, the dividers are not biased. For example, when the equation (1) is used, the dividing point determination function selection unit 130 selects the dividing point determination function so that the score of the dividing point determination function becomes large.

Figure 14:
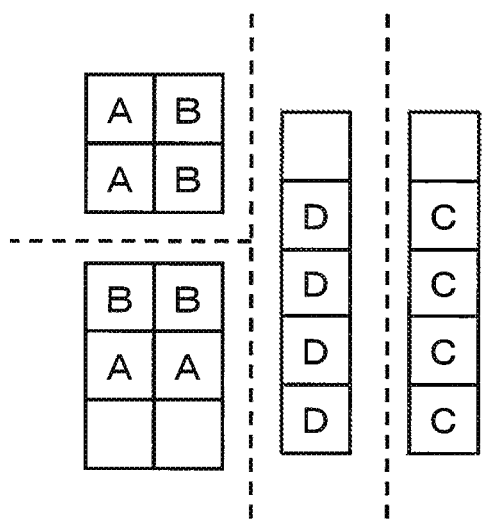
FIG. 14 is a figure for explaining division of data according to the first exemplary embodiment.

FIG. 14 shows the group after division. In this case, the score is calculated as follows.

$$\begin{aligned}score &= \text{entropy of the group shown in a left part} + \\ &\quad \text{entropy of the group shown in a right part} \\ &= (0.15052 + 0.15052 + 0.00000 + 0.00000) + \\ &\quad (0.15052 + 0.15052 + 0.00000 + 0.00000) \\ &= 0.60208\end{aligned}$$

The values are rounded off to five decimal places.

In two groups shown in a left part of FIG. 14, the numbers of the information providers are equal to each other [division 1].

After the third division, the number of records included in each of all the groups is 4. Therefore, the division unit 100 determines that all the groups are in the division end state.

After this process, the abstraction unit 150 anonymizes the data.

Here, when the result of the division performed by the information processing device 10 according to this exemplary embodiment is compared with the result of the division shown in FIG. 11, the information processing device 10 according to this exemplary embodiment can divide data into more groups.

Figure 15:
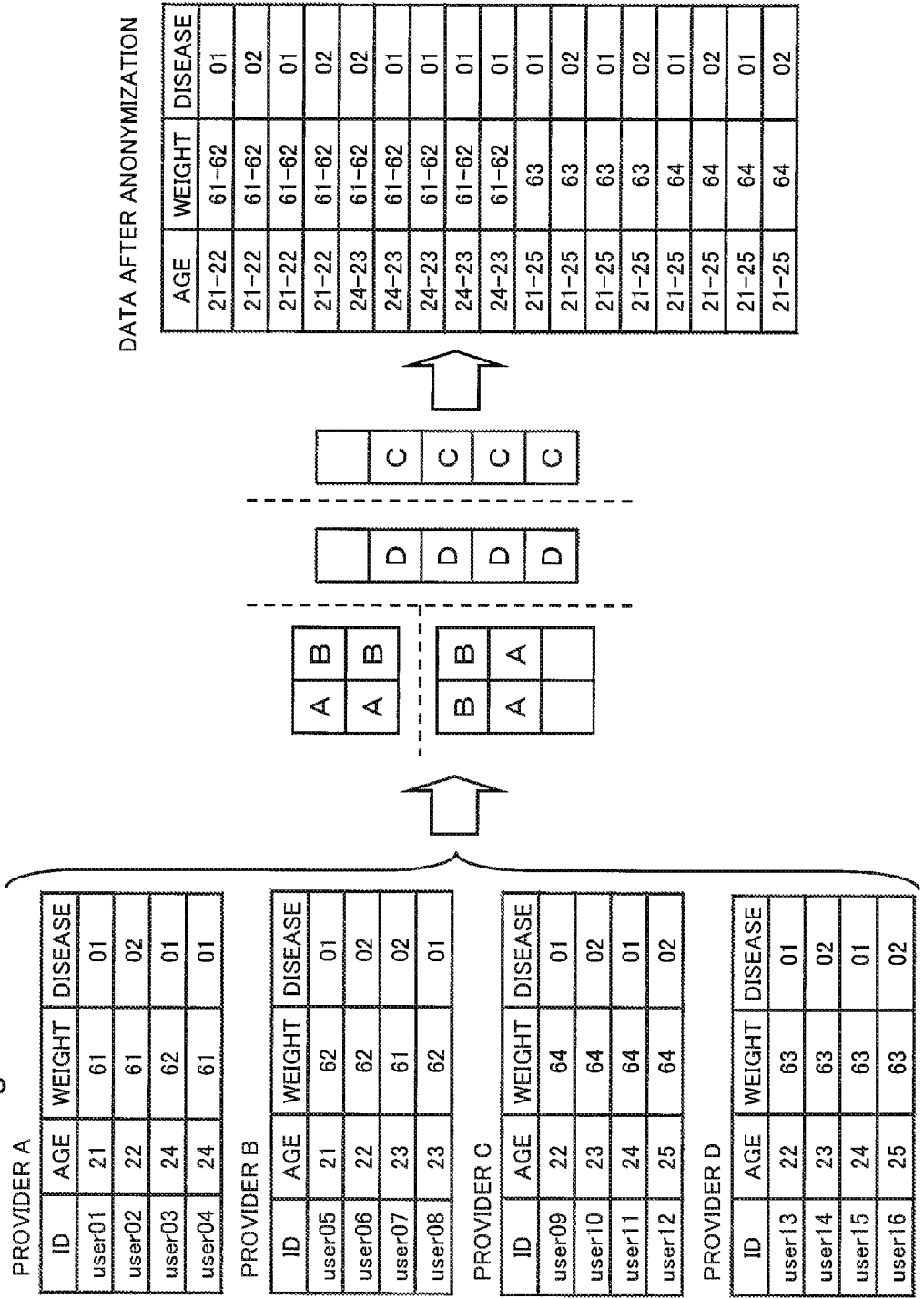
FIG. 15 is a figure showing an example of data after anonymization.

FIG. 15 shows an example of the anonymized data obtained by applying the division shown in FIG. 14 to the data shown in FIG. 10. Further, in FIG. 15, the ID that is a clear identifier is eliminated when the anonymization is performed.

For example, even when an attacker of the provider A acquires the anonymized data, the data after anonymization shown in FIG. 15 has 2-anonymity. Namely, the data after anonymization has 2-site-anonymity.

Here, as a reference, the division that does not use the dividing point determination function selection unit 130 will be described.

In this case, because the division method is not selected, the performed division is one of "a division so that the providers are not biased" or "a "division so that the providers are biased".

Figure 16:
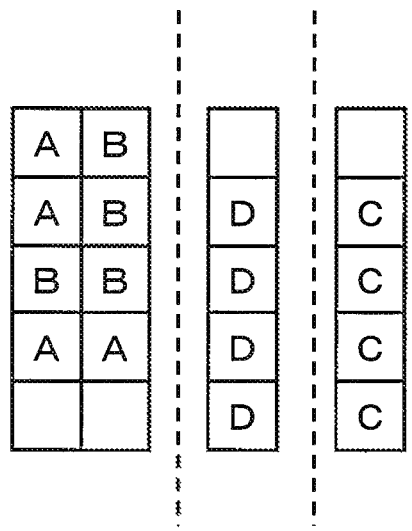
FIG. 16 is a figure showing an example of division when dividing so as to be biased.

FIG. 16 shows an example of the division in which the division is performed so that the providers are biased. The division shown in FIG. 16 is the same as the division shown in FIG. 13. However, when the group shown in a left part of FIG. 16 is divided so that the providers are biased, sk-site-anonymity cannot be satisfied. Therefore, when dividing so that the providers are biased, the groups are divided into three groups.

Figure 17:
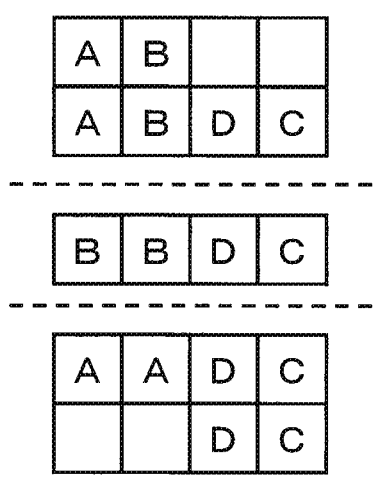
FIG. 17 is a figure showing an example of division when dividing so as not to be biased.

FIG. 17 shows an example of the division in which the division is performed so that the providers are not biased. When this division is performed, the groups are divided into three groups.

The division (FIG. 14) performed by the information processing device 10 according to the exemplary embodiment is more appropriate than the division shown in FIG. 16 and FIG. 17.

Thus, the information processing device 10 according to the exemplary embodiment have an effect in which appropriate anonymization of the data can be realized with respect to the provider.

The reason is as follows.

The dividing point determination function selection unit 130 according to the exemplary embodiment selects the dividing point determination function so that the providers are biased when the division can be performed so that the number of providers becomes one. Therefore, the information processing device 10 can generate the groups in which the number of providers is one. Alternatively, when the division cannot be performed so that the number of providers becomes one, the dividing point determination function selection unit 130 selects the dividing point determination function so that the providers are not biased. Therefore, the information processing device 10 can avoid the division in which the index cannot be satisfied before the number of providers becomes one and generate the groups in which the providers are not biased.

Further, in dividing groups, there is a case in which a group in which the providers are extremely biased is generated. For example, there is a case in which a group in which the data without few (for example, several percent) data are provided by the same provider is generated. In such case, the information processing device 10 may not perform the division using the dividing point determination function, but generate the group in which the number of providers is one by deleting or moving the data provided by a different provider.

In the explanation of the information processing device 10 according to the exemplary embodiment, "the division so that the providers are biased" and "the division so that the providers are not biased" have been explained. However, the information processing device 10 may use a term of "color" and perform a process of "the division so that the number of colors becomes one" and a process of "the division so that the colors are not biased". For example, the process of "the division so that the number of colors becomes one" is a process of the division so that the number of colors after division is counted and the division is performed based on a result of the determining whether or not the number of colors is one.

Modification Example

Further, the configuration of the information processing device 10 is not limited to the configurations shown in FIG. 2 and FIG. 3.

The elements of the information processing device 10 shown in FIG. 2 and FIG. 3 may be modified so that the element shown in FIG. 2 and FIG. 3 is divided into a plurality of elements. For example, the division determination unit 140 may be divided into an element which calculates the dividing point and an element which divides a group into groups based on the dividing point. Further, the abstraction unit 150 may be divided into an element which anonymizes the data and an element which transmits the data after anonymization.

Some elements of the information processing device 10 may be integrated into one element. For example, the dividing point determination function selection unit 130 and the division determination unit 140 may be integrated into one element.

Further, the information processing device 10 according to the exemplary embodiment may be realized as a computer including a CPU (Central Processing Unit), a ROM (Read Only Memory), a RAM (Random Access Memory), an IO (Input/Output unit), and a NIC (Network Interface Circuit or Network interface Card).

Figure 18:
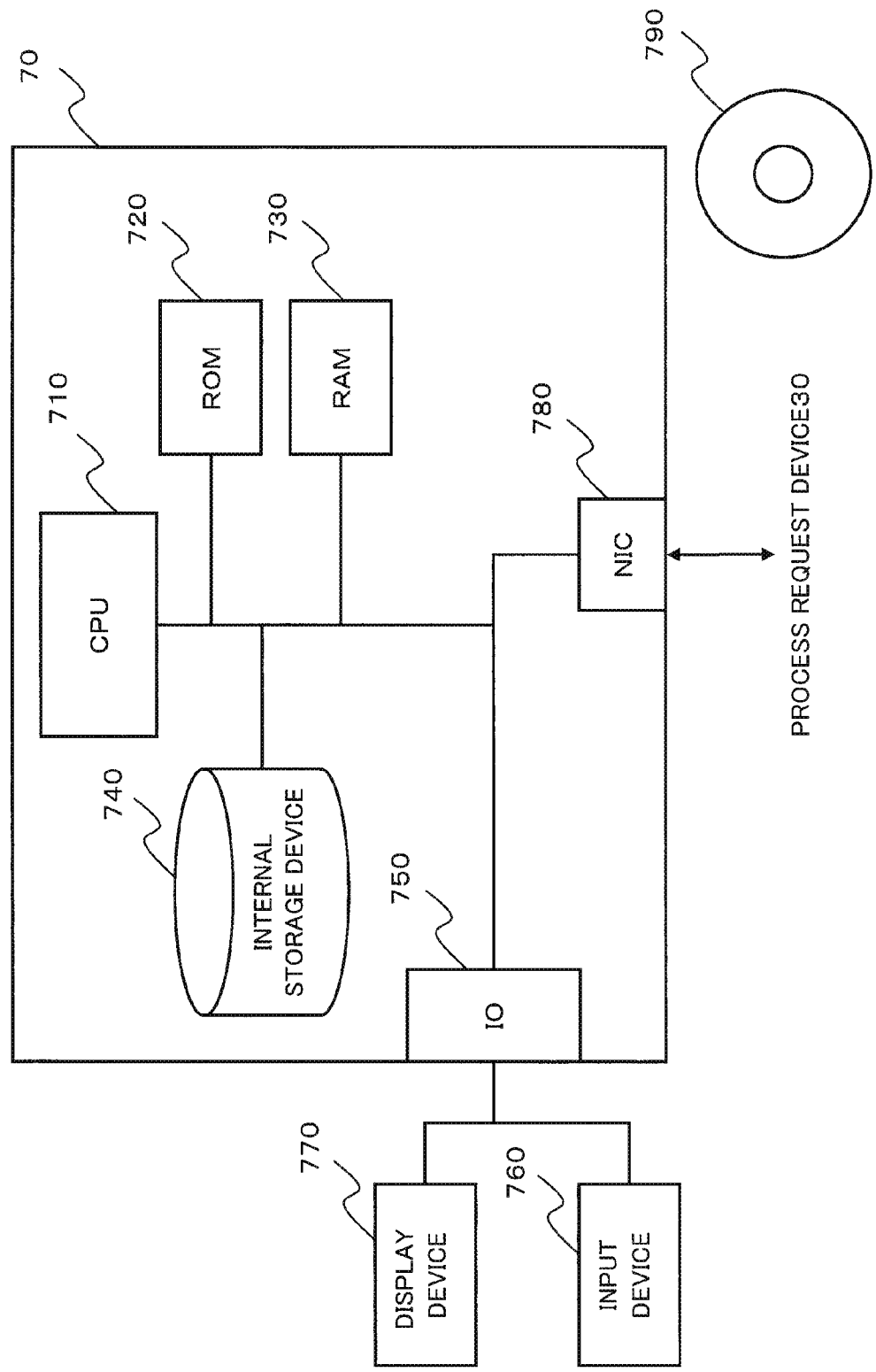
FIG. 18 is a block diagram showing an example of a configuration of the information processing device according to the first exemplary embodiment.

FIG. 18 is a block diagram showing an example of a configuration of an information processing device 70 according to the exemplary embodiment that has a different configuration.

The information processing device 70 includes a CPU 710, a ROM 720, a RAM 730, an internal storage device 740, an IO 750, an input device 760, a display device 770, and a NIC 780, and configures a computer.

The CPU 710 reads a program from the ROM 720 or the internal storage device 740. The CPU 710 realizes each of the functions of the index reception unit 110, the record number measurement unit 120, the dividing point determination function selection unit 130, the division determination unit 140, and the abstraction unit 150 of the information processing device 10 shown in FIG. 3 based on the read program. When the CPU 710 realizes each of the functions, the CPU 710 uses the RAM 730 and the internal storage device 740 as a temporary storage device. Further, the CPU 710 receives the input data from the input device 760 via the IO 750 and displays the data on the display device 770.

Further, the CPU 710 may read a program stored in the storage medium 790 which stores the program so as to be computer-readable by using a storage medium read device (not shown). Alternatively, the CPU 710 may receive the program from an external device (not shown) via the NIC 780.

The ROM 720 stores the program executed by the CPU 710 and the fixed data. The ROM 720 is, for example, a P-ROM (Programmable-ROM) or a flash ROM.

The RAM 730 stores the program executed by the CPU 710 and the data temporarily. The RAM 730 is, for example, a D-RAM (the Dynamic-RAM).

The internal storage device 740 stores the data stored for a long time and the program for the information processing device 70. Further, the internal storage device 740 may operate as a temporary storage device of the CPU 710. The internal storage device 740 is, for example, a hard disk device, a magneto optical disk device, an SSD (Solid State Drive), or a disk array device.

Further, the internal storage device 740 or the RAM 730 may operate as the group information holding unit 200.

The IO 750 intermediates data between the CPU 710, and the input device 760 and the display device 770. The IO 750 is, for example, an IO interface card.

The input device 760 is an input unit which receives an input instruction from an operator of the information processing device 70. The input device 760 is, for example, a keyboard, a mouse, or a touch panel.

The display device 770 is a display unit of the information processing device 70. The display device 770 is, for example, a liquid crystal display.

The NIC 780 relays information between the information processing device 70 and another device (for example, the process request device 30) via the network. The NIC 780 is, for example, a LAN (Local Area Network) card.

The information processing device 70 constructed like above can achieves the same effect as the information processing device 10.

The reason is because the CPU 710 of the information processing device 70 can realize the same operation as the information processing device 10 based on the program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-230937, filed on Oct. 18, 2012, the disclosure of which is incorporated herein in its entirety by reference.

REFERENCE SINGS LIST 10 information processing device
30 process request device
40 information processing system
70 information processing device
100 division unit
110 index reception unit
120 record number measurement unit
130 dividing point determination function selection unit
140 division determination unit
150 abstraction unit
200 group information holding unit
310 pre-anonymization data holding unit
320 data transmission unit
330 anonymization process start request unit
340 result reception unit 350 anonymized data holding unit
710 CPU
720 ROM
730 RAM
740 internal storage device
750 IO
760 input device
770 display device
780 NIC
790 storage medium

The invention claimed is:

1. An information processing device comprising:
a CPU;
a memory connected with the CPU;
the CPU configured to read a program from the memory that realizes the functions of:
an index reception unit which receives an index of anonymization of data;
a group state measurement unit which measures a state of a group divided for anonymization of the data;
a dividing point determination function selection unit which selects a dividing point determination function for determining a dividing point of the group based on the index and the state of the group;
a division determination unit which calculates the dividing point of the data based on the selected dividing point determination function and divides the data into groups; and
an abstraction unit which anonymizes the data based on the group,
wherein
the dividing point determination function selection unit selects
the dividing point determination function with which a division is performed so that providers of the data included in the divided group are biased and the dividing point determination function with which a division is performed so that providers are not biased, as the selection.

2. The information processing device according to claim 1, wherein
the dividing point determination function selection unit
determines whether or not the division can be performed so that the number of the providers becomes one based on the index and the state of the group,
selects the dividing point determination function with which the division is performed so that the providers are biased when the division can be performed so that the number of the providers becomes one, and
selects the dividing point determination function with which the division is performed so that the providers are not biased when determined that the division cannot be performed.

3. The information processing device according to any one of claim 1, wherein
the dividing point determination function selection unit uses at least one of k-anonymity which includes at least k pieces of data that includes the same quasi-identifier, sk-site-anonymity which includes at least sk pieces of data that includes the same quasi-identifier even when the data provided by any provider is excluded, or a number of the providers, as the index.

4. The information processing device according to claim 3, wherein
the dividing point determination function selection unit targets a combination of at least a part of the providers as the sk-site-anonymity.

5. The information processing device according to claim 1, wherein
the dividing point determination function selection unit performs at least one of selection from among a plurality of the functions, determination of the magnitude of the value of the function, or combination of the functions, as the selection of the function.

6. The information processing device according to claim 5, wherein
the dividing point determination function selection unit uses a function including entropy of the data as the dividing point determination function, and
selects the determination of the magnitude of the dividing point determination function as the selection.

7. The information processing device according to claim 1, wherein
the group state measurement unit measures a number of records included in the group as the state of the group.

8. An information processing method for an information processing device, the information processing device comprising: a CPU; and a memory which is connected to the CPU, wherein
the method comprising:
receiving an index of anonymization of data;
measuring a state of a group divided for anonymization of the data;
selecting a dividing point determination function for determining a dividing point of the group based on the index and the state of the group;
calculating the dividing point of the data based on the selected dividing point determination function;
dividing the data into groups;
anonymizing the data based on the group; and
selecting the dividing point determination function with which a division is performed so that providers of the data included in the divided group are biased and the dividing point determination function with which a division is performed so that providers are not biased, as the selection.

9. A computer readable non-transitory medium embodying a program, the program causing an information processing device, which comprising: a CPU; and a memory which is connected to the CPU, to perform a method, the method comprising:
receiving an index of anonymization of data;
measuring a state of a group divided for anonymization of the data;
selecting a dividing point determination function for determining a dividing point of the group based on the index and the state of the group;
calculating the dividing point of the data based on the selected dividing point determination function;
dividing the data into groups;
anonymizing the data based on the group; and
selecting the dividing point determination function with which a division is performed so that providers of the data included in the divided group are biased and the dividing point determination function with which a division is performed so that providers are not biased, as the selection.

10. An information processing device comprising:
index reception means for receiving an index of anonymization of data;
group state measurement means for measuring a state of a group divided for anonymization of the data;
dividing point determination function selection means for selecting a dividing point determination function for determining a dividing point of the group based on the index and the state of the group;

division determination means for calculating the dividing point of the data based on the selected dividing point determination function and dividing the data into groups; and abstraction means for anonymizing the data based on the group, wherein the dividing point determination function selection means selects the dividing point determination function with which a division is performed so that providers of the data included in the divided group are biased and the dividing point determination function with which a division is performed so that providers are not biased, as the selection.

* * * * *